Nov. 9, 1943.   C. G. PETERSON   2,334,124
CARGO LOADING AND SECURING
Filed Nov. 9, 1942   2 Sheets-Sheet 1
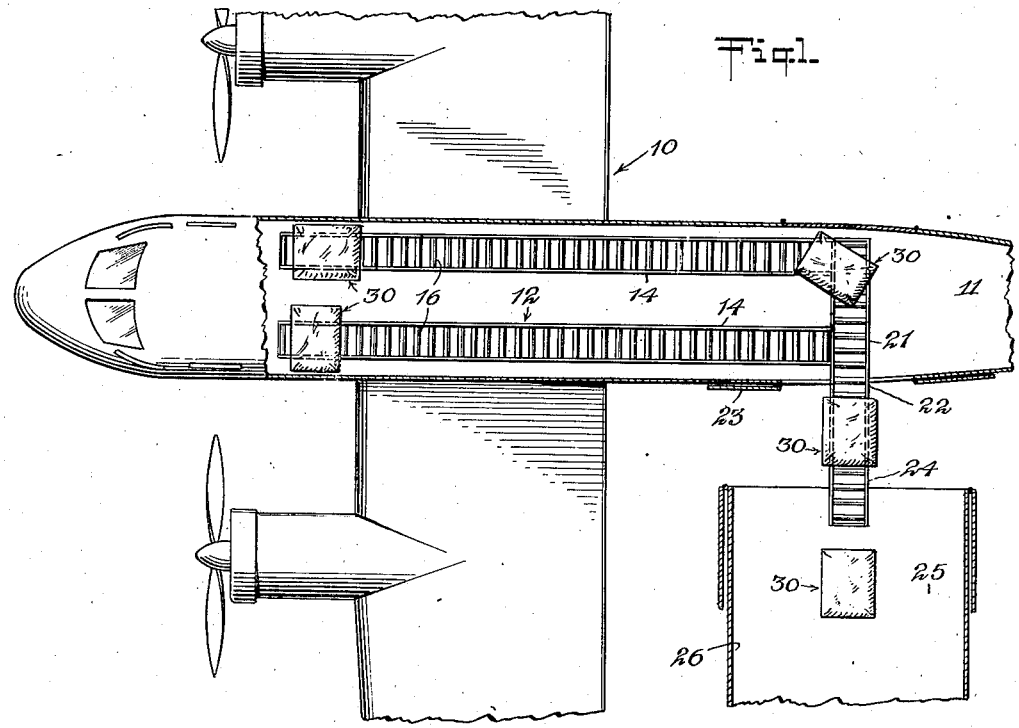
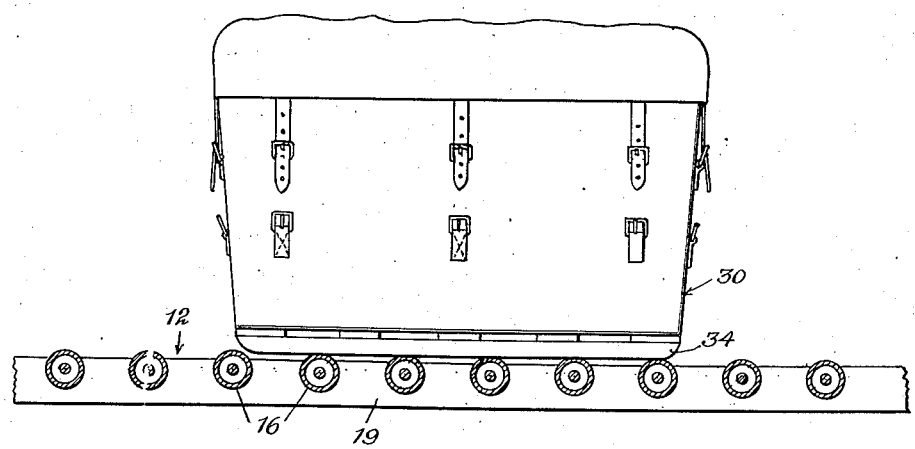
INVENTOR
Gilbert Peterson
BY
ATTORNEYS Nov. 9, 1943.                C. G. PETERSON                2,334,124
                        CARGO LOADING AND SECURING
                           Filed Nov. 9, 1942        2 Sheets-Sheet 2
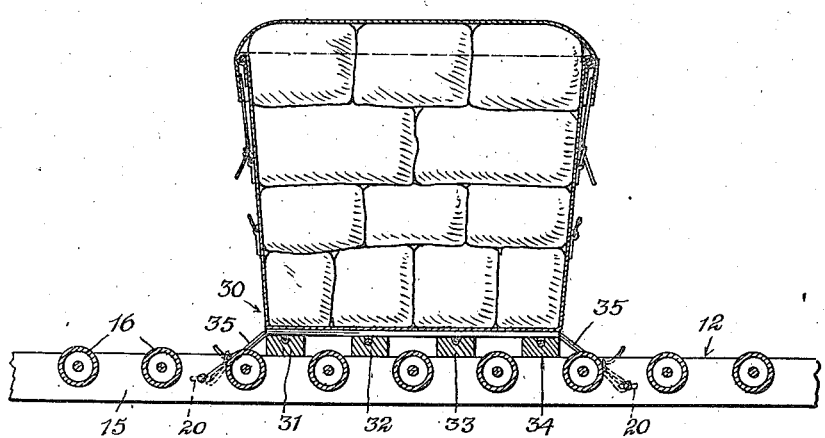
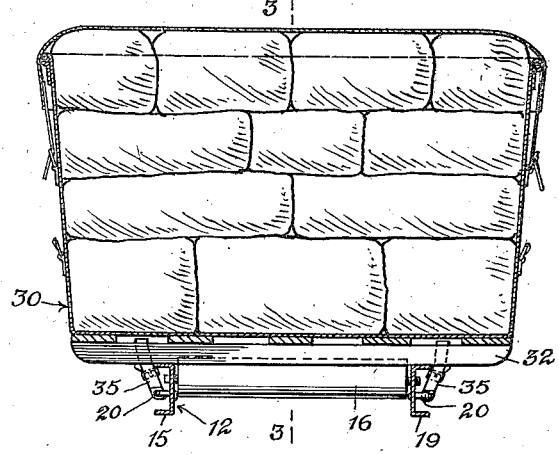
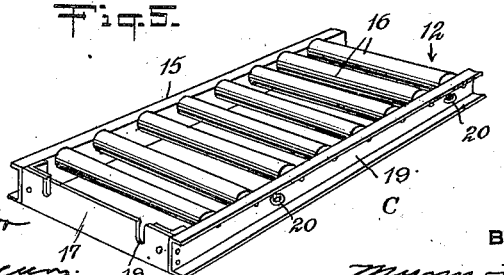
INVENTOR
Gilbert Peterson
BY
ATTORNEYS Patented Nov. 9, 1943

2,334,124

UNITED STATES PATENT OFFICE 2,334,124

CARGO LOADING AND SECURING

C Gilbert Peterson, New Canaan, Conn.

Application November 9, 1942, Serial No. 465,072

4 Claims. (Cl. 214—83)

This invention relates to a method of loading and securing cargo in various types of vehicles. It is particularly adapted to cargo airplanes because of the inherent nature of the planes.

Most cargo planes when on the ground, due to the nature of their landing gear, have their floor space at a rather acute angle. Moreover, the door or entrance is normally at the rear of the plane and is usually rather small.

Due to the nature of planes and their relatively fragile construction, it is unwise to back the truck up close enough to the door to allow the cargo to be passed directly from the truck onto the floor of the plane. It has been necessary therefore to pass the cargo up into the door of the plane and then to drag it upgrade to its utimate position where it is necessary to lash it into place.

One object of this invention is to provide loading structure, either built in the plane originally, or readily positioned therein for loading purposes, to facilitate the movement of the cargo into place and the securing of the cargo during flight to overcome shifting due to the rapidity of acceleration, centrifugal force, landing and take-off conditions, as well as the various positions other than level an airplane invariably takes during flight.

The invention contemplates a combined use of roller conveyors and cargo containers which have skids or runner members on the bottom thereof to facilitate movement of the containers on the rollers, but having the skids or runners so spaced with relation to the space between the rollers that when the containers are turned at right angles, the skids will rest on a fixed rather than on a rolling surface.

Other advantages and purposes of the invention will appear as the description proceeds.

Fig. 1 is a plan view, partly in section, of a cargo airplane showing my invention;

Fig. 2 is a side elevation showing the container in one position on the conveyor;

Fig. 3 is a cross sectional view taken on the line 3—3 of Fig. 4, showing the container in a different position on the conveyor;

Fig. 4 is a cross sectional view taken at right angles to the view shown in Fig. 3;

Fig. 5 is a perspective view of a type of conveyor which may be used with my invention.

Referring to Fig. 1, the conventional cargo plane 10 has an elongated chamber 11 rearwardly of the pilot's cabin, which may be used for cargo space. Placed on the floor 12 of chamber 11 are one or more roller conveyors 14. It is contemplated that in future cargo planes, roller conveyors 14 may be built into the structure without any substantial increase in weight. For use in present day conventional cargo planes, are roller conveyors 14 which may consist of frame members 15 spaced by a series of rollers 16. The conveyor may be permanently fastened to the floor of the plane or may be made in sections and be removable. When made in sections, the end 17 of the section is provided with slots 18 to receive connecting members from the next section. The span 19 of the frame members 15 may be provided with rings 20 for securing the cargo.

While the positioning of the roller conveyors 14 is dependent upon the nature of the plane and the work for which it is built, and is, therefore, variable, I contemplate two sets of roller conveyors, as shown in Fig. 1, with an additional roller conveyor 21 either removable or jointed at 22 so that it may be removed to allow the doors 23 to close. The section 24 extends outwardly to the floor 25 of the truck 26.

For use with my system, I have devised a carrier 30, more fully described in my co-pending application, Serial No. 465,073, filed November 9, 1942, but which is provided with a plurality of skids 31, 32, 33 and 34, running longitudinally of the container and spaced so that when the carrier 30 is placed on the roller conveyor with the skids at right angles to the rollers 16, the carrier may be moved along the rollers, while when the carrier is turned at right angles, the skids will rest on the bars 15 and not contact the rollers.

In loading the plane, the carriers 30 are placed on the conveyor rollers directly from the truck, pushed into the plane, turned at right angles to roll on the roller conveyors, until their proper place is reached, at which point they may be turned at right angles so that the skids are positioned between the rollers rather than on them, where the weight of the carrier, with the skids extending over three or more rollers, anchors it in place.

My carriers 30 are provided with straps or other fastening means 35 adapted to engage the rings 20 where the roller conveyor is fixed in the plane, or similar rings on the floor of the plane where the roller conveyor is removable. Where the conveyors are fixed, an aisle may be left so that the particular conveyors can be examined and reached during flight.

It will be appreciated that, with the use of my method and structure, cargo planes may be unloaded and loaded in a fraction of the time now necessary under present methods. Since the time of loading and unloading necessarily must be figured in the time of delivery of a cargo, this time cuts down the advantage of speedy transportation. Therefore, minutes saved in loading has the effect of increasing the speed of the transporting vehicle.

While I have used a cargo airplane to describe and illustrate my invention, it will be appreciated that it may be adapted to freight cars, trucks, vessels, or any other cargo moving vehicle.

When it is desired to remove the conveyor rollers after loading, they may be made in sections and slid out from under the containers after the plane is loaded. However, they may be made so light that the saving in time in loading and unloading more than compensates for any additional weight.

I claim:

1. In combination with a vehicle having a floor and roller conveyors mounted in said floor, of a cargo carrier, said cargo carrier having parallel skids adapted to allow the carrier to be moved on said rollers, said skids being so spaced that when said carrier is turned to a position where the skids are parallel with said rollers, said skids will rest between said rollers.

2. In combination with a vehicle having a floor and roller conveyors mounted in said floor, of a cargo carrier, said cargo carrier having parallel skids adapted to allow the carrier to be moved on said rollers, said skids being so spaced that when said carrier is turned to a position where the skids are parallel with said rollers, said skids will rest between said rollers, and cooperating means on said carrier and on said floor to anchor said carrier in place.

3. In combination with a roller conveyor, a cargo carrier adapted to be moved thereon, said cargo carrier having parallel skids adapted to move over the rolls of said roller conveyor when placed in one position, and to rest between the rolls of said roller conveyor when said carrier is turned to another position, and fastening elements carried by said carrier adapted to engage said conveyor to anchor said carrier in place.

4. In combination with an airplane having floor and roller conveyors mounted in said floor, of a cargo carrier, said cargo carrier having parallel skids adapted to allow the carrier to be moved on said skids, said skids being so spaced with relation to said rollers that when said carrier is turned to position where said skids are parallel to said rollers, said skids will rest between said rollers, and cooperating means on said carrier and on said conveyor to anchor said carrier in place.

C GILBERT PETERSON.